United States Patent
Dubois et al.

(10) Patent No.: US 6,589,370 B1
(45) Date of Patent: Jul. 8, 2003

(54) DEVICES FOR ABSORBING INFRARED RADIATION COMPRISING A QUASI-CRYSTALLINE ELEMENT

(75) Inventors: Jean-Marie Dubois, Pompey (FR); Francis Machizaud, Vandoeuvre (FR)

(73) Assignees: Centre National de la Recherche Scientifique, Paris (FR); Societe Nouvelle de Metallisation Industries, Avignon (FR)

( * ) Notice: Subject to any disclaimer, the term of this patent is extended or adjusted under 35 U.S.C. 154(b) by 0 days.

(21) Appl. No.: 09/446,118

(22) PCT Filed: Jun. 26, 1997

(86) PCT No.: PCT/FR97/01145
§ 371 (c)(1), (2), (4) Date: Apr. 18, 2000

(87) PCT Pub. No.: WO99/00458
PCT Pub. Date: Jan. 7, 1999

(51) Int. Cl.⁷ .............................................. C22C 21/00
(52) U.S. Cl. .................... 148/403; 428/650; 374/32; 374/179
(58) Field of Search .................. 148/403; 428/650; 374/32, 179

(56) References Cited

U.S. PATENT DOCUMENTS

| | | | | |
|---|---|---|---|---|
| 5,053,085 A | 10/1991 | Masumoto et al. | ......... | 148/403 |
| 5,204,191 A | 4/1993 | Dubois et al. | ............. | 428/650 |
| 5,472,920 A | 12/1995 | Dubois et al. | ............. | 501/103 |
| 5,649,282 A | 7/1997 | Dubois et al. | ............. | 428/548 |
| 5,652,877 A | 7/1997 | Dubois et al. | ............. | 428/553 |
| 5,912,045 A | * 6/1999 | Eisenhammer et al. | ..... | 427/125 |
| 6,103,023 A | * 8/2000 | Cyrot-Lackmann et al. | | 148/404 |

FOREIGN PATENT DOCUMENTS

| | | | |
|---|---|---|---|
| DE | 4425140 | * | 7/1995 |
| DE | 19620645 | * | 12/1996 |
| EP | 504048 | * | 9/1992 |
| EP | 0 605 273 | | 7/1994 |
| EP | 0 521 138 | | 11/1997 |
| FR | 2693185 | * | 1/1994 |
| FR | 2744839 | * | 8/1997 |
| WO | WO 92 13111 | | 8/1992 |
| WO | WO 93 13237 | | 7/1993 |
| WO | 96/31640 | * | 10/1996 |

OTHER PUBLICATIONS

Eisenhamer, T. "Quasicrystal Films: Numerical Optimization as a Solar Selective Absorber", Thin Solid Films, vol. 270, Dec. 1995, pp. 1–5.*

Eisenhammer, T. et al., "Selective Absorbers based on AlCuFe Thin Films", Solar Energy Materials and Solar Cells, vol. 46, Apr. 1997, pp. 53–65.*

* cited by examiner

Primary Examiner—George Wyszomierski
(74) Attorney, Agent, or Firm—Oblon, Spivak, McClelland, Maier & Neustadt, P.C.

(57) ABSTRACT

The invention relates to a device that absorbs infra-red radiation, which comprises as a coupler element for the infra-red radiation, an element made of a quasi-crystalline alloy, made up of one or more quasi-crystalline phases, the volume of which represents at least 40% by volume of the quasi-crystalline alloy, a quasi-crystalline phase being either a quasi-crystalline phase in the strict sense, or an approximating phase or an approximating compound. The invention is used in applications such as in a bolometer, infra-red filter, thermocouple, or hot plate.

21 Claims, 1 Drawing Sheet

DEVICES FOR ABSORBING INFRARED RADIATION COMPRISING A QUASI-CRYSTALLINE ELEMENT

Figure 1:
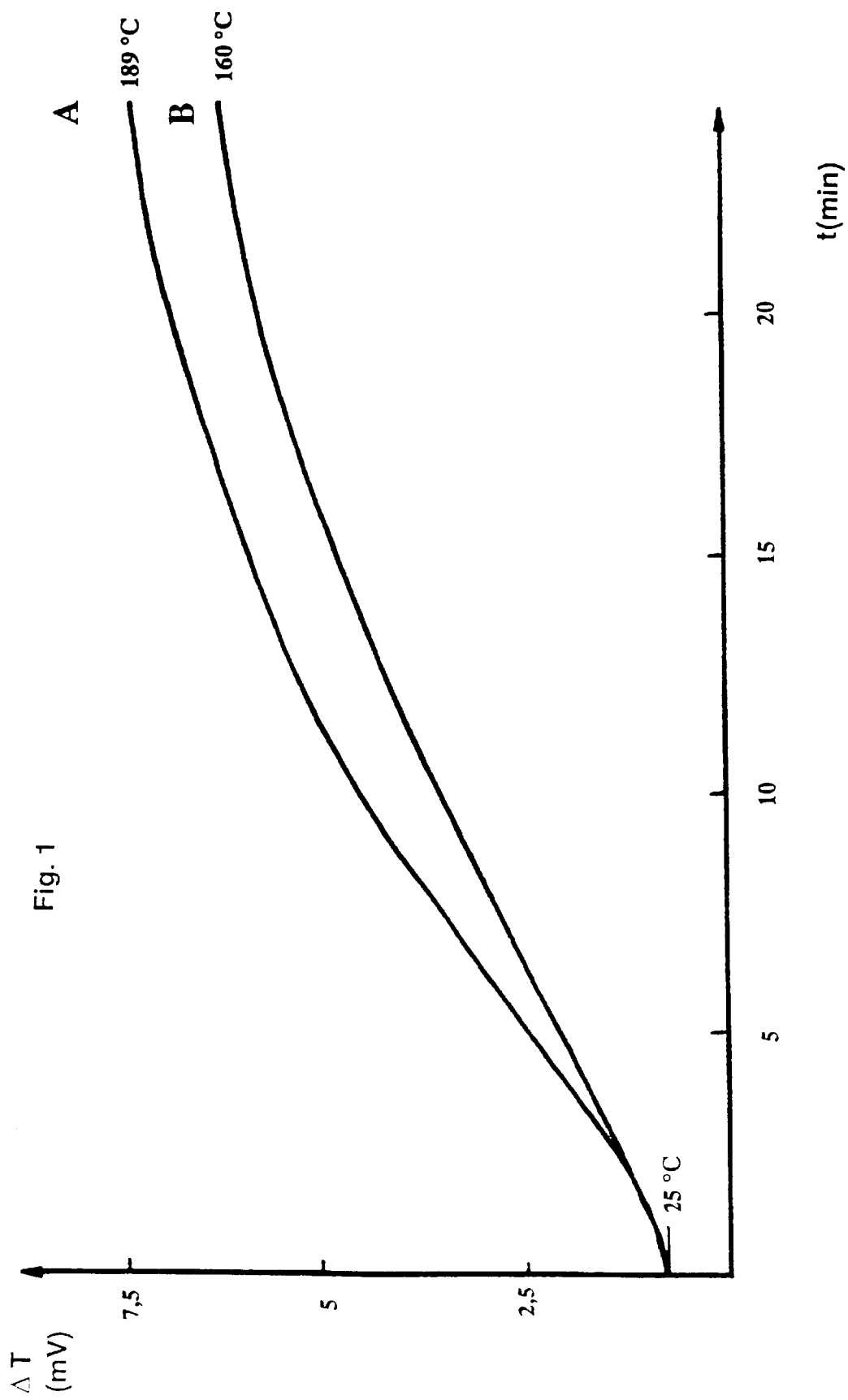

This invention relates to the use of quasi-crystalline alloys for the absorption of infra-red radiation as well as devices for the absorption of infra-red radiation comprising an element made of a quasi-crystalline alloy.

Various types of devices are known that absorb infra-red radiation. In particular, devices are known that carry out the photo-thermal conversion of the infra-red radiation, in which the absorbed light energy is converted into heat. These are notably solar radiation collectors which include a layer of a paint that absorbs the infra-red radiation, deposited on a substrate. Among these devices, one may mention, in particular, collectors with a heat exchange medium or the Trombe wall. In these devices, the heat is taken from the absorbent medium through the substrate, assumed to be a good thermal conductor, by a heat exchange fluid, from which the collected energy is extracted. In general, said paints are made up of organic materials containing absorbent pigments or metal powders which are very finely divided and bonded by an organic additive. Metals can only be used in a very finely divided state, or possibly in the form of a massive element having a very high surface roughness since they are strongly reflecting in the massive state and smooth. However such materials show a poor resistance to external attack and are damaged by mechanical scratching, wear or corrosion. Because of this, they must be protected against attack, for example by glass screens, which increases the price and decreases the durability of them. Furthermore, the interface formed between the absorbing paint and its substrate plays a decisive role in the flow of heat transmitted to the heat exchange fluid and in the life span of the device. Devices are also known in which the infra-red radiation is converted into electrical signals. Among these devices, one may mention bolometers, in which the infra-red radiation causes a variation in the resistance of metallic or semi-conductor elements. The material used for the absorption of the infra-red radiation must have a high electrical resistivity, a high temperature coefficient and a low thermal conductance.

One can also mention, thermal probes (thermocouples) in which the e.m.f. of a pair of conductors of a different kind is measured.

For all these types of infra-red radiation sensors used as detectors, it is necessary to have a low dark current, which means that they are often placed inside a cooled enclosure intended to reduce thermal excitation in the materials and to reduce the flow of ambient radiation.

Furthermore, quasi-crystalline alloys are known, which are alloys made up of one or more quasi-crystalline phases. By quasi-crystalline phase, one understands a quasi-crystalline phase in the strict sense or a phase that approximates to one. A quasi-crystalline phase in the strict sense is a phase that has a symmetry of rotation normally incompatible with the symmetry of translation, that is to say a rotation axis symmetry of order 5, 8, 10 or 12, these symmetries being revealed by the diffraction of the radiation. By way of example, one can mention the icosahedric phase of point group m3 5 and the decagonal phase of a point group 10/mmm. An approximating phase or an approximating compound is a true crystal to the extent that its crystallographic structure remains compatible with the symmetry of translation, but which has, in the electron diffraction image, diffraction diagrams the symmetry of which is close to rotation axes 5, 8, 10 or 12. By way of example, one can mention the orthorhombic phase $O_1$, characteristic of an alloy having the atomic composition $Al_{65}Cu_{20}Fe_{10}Cr_5$, the lattice parameters of which are: $a_0^{(1)}=2.366$, $b_0^{(1)}=1.267$, $c_0^{(1)}=3.252$ in nanometers. This orthorhombic phase $O_1$ is said to be approximate to the decagonal phase. Furthermore, it is so close that it is not possible to distinguish its X-ray diffraction diagram from that of the decagonal phase. One can also mention the rhombohedric phase with parameters $a_R=3.208$ nm, $\alpha=36°$, shown in alloys of composition close to $Al_{64}Cu_{24}Fe_{12}$ in its number of atoms. This phase is a phase that approximates to the icosahedric phase. One can also mention the orthorhombic phases $O_2$ and $O_3$ with respective parameters $a_0^{(2)}=3.83$; $b_0^{(2)}=0.41$; $c_0^{(2)}=5.26$ and $a_0^{(3)}=3.25$; $b_0^{(3)}=0.41$; $c_0^{(3)}=9.8$ in nanometers which is formed in the alloy of composition $Al_{63}Cu_8Fe_{12}Cr_{12}$ in its number of atoms. One can further mention a phase C, of cubic structure, very often observed in coexistence with the approximating phases or true quasi-crystalline phases. This phase which is formed in certain Al—Cu—Fe and Al—Cu—Fe—Cr alloys, consists of a superlattice, through a chemical ordering effect of the alloy elements in relation to the aluminum sites, of a phase with a CsCl structure and a lattice parameter $a_1=0.297$ nm. One can also mention an H phase of hexagonal structure which derives directly from the C phase as the epitaxy relationships, as observed by electron microscopy demonstrate, between crystals of the C and H phases and the simple relationships which link the parameters of the crystal lattices, namely $a_H=3\sqrt{2}a_1\sqrt{3}$ (roughly 4.5%) and $c_H=3\sqrt{3}a_1/2$ (roughly 2.5%). This phase is isotypical of a hexagonal phase, designated $\Phi AlMn$, discovered in Al—Mn alloys containing 40% by weight of Mn. The cubic phase, its superlattices and the phases which derive from it, constitute a class of phases approximating to quasi-crystalline phases of neighboring composition. For more information about quasi-crystalline phases in the strict sense and phases approximating to them, reference can be made to EP-A-0 521 138 (J. M. Dubois, P. Cathonnet).

The quasi-crystalline alloys generally have good mechanical properties, high thermal stability and good resistance to corrosion.

The present inventors have now found that the rate of absorption of infra-red radiation of these quasi-crystalline alloys is particularly high and that they could be advantageously used in devices intended to absorb infra-red radiation.

Consequently, the objective of this invention is the use of quasi-crystalline alloys for the absorption of the infra-red radiation, and a device that absorbs the infra-red radiation, which includes an element made of a quasi-crystalline alloy.

A device according to this invention, that absorbs the infra-red radiation, is characterized in that it comprises as a coupler element for the infra-red radiation, an element made of a quasi-crystalline alloy made up of one or more quasi-crystalline phases representing at least 40% by volume of quasi-crystalline alloy, a quasi-crystalline phase being either a quasi-crystalline phase in the strict sense which has symmetries of rotation normally incompatible with the symmetry of translation, that is to say rotation axis symmetries of order 5, 8, 10 and 12, or an approximating phase or an approximating compound which is a true crystal the crystallographic structure of which remains compatible with the symmetry of translation, but which has, in the electron diffraction image, diffraction diagrams the symmetry of which is close to rotation axes 5, 8, 10 or 12.

A particularly preferred quasi-crystalline alloy is an alloy in which the quasi-crystalline phase is an icosahedric phase of point group m3 5 or a decagonal phase of the point group 10/mmm.

The quasi-crystalline alloys in which the quasi-crystalline phases represent at least 80% by volume are particularly preferred.

Among the quasi-crystalline alloys which can be used for the devices of this invention, one can mention those which show one of the following nominal compositions, which are given as an atomic percentage:

$Al_aCu_bFe_cX_dY_eI_g$, (I) in which X represents at least one element chosen from among B, C, P, S, Ge and Si, Y represents at least one element chosen from among V, Mo, Ti, Zr, Nb, Cr, Mn, Ru, Rh, Ni, Mg, W, Hf, Ta and the rare earths and I represents the unavoidable production impurities, $0 \leq g \leq 2$, $14b \leq 30$, $7 \leq c \leq 20$, $0 \leq d \leq 5$, $21 \leq b+c+e \leq 45$ and $a+b+c+d+e+g=100$;

$Al_aPd_bX_cY_dT_eI_g$ (II) in which X represents at least one metalloid chosen from among B, C, Si, Ge, P and S; Y represents at least one metal chosen from among Fe, Mn, V, Ni, Cr, Zr, Hf, Mo, W, Nb, Ti, Rh, Ru, Re; T is at least one rare earth and I represents the unavoidable production impurities; with $a+b+c+d+e+f+g=100$; $17 \leq b \leq 30$; $0 \leq c \leq 8$; $5 \leq d \leq 15$; $0 \leq e \leq 4$; $0 \leq g \leq 2$;

$Al_aCu_bCO_cX_dY_eT_fI_g$ (III) in which X represents at least one metalloid chosen from among B, C, Si, Ge, P and S; Y represents at least one metal chosen from among Fe, Mn, V, Ni, Cr, Zr, Hf, Mo, W, Nb, Ti, Rh, Ru, Re; T is at least one rare earth and I represents the unavoidable production impurities; with $a+b+c+d+e+f+g=100$; $14 \leq b \leq 27$; $8 \leq c \leq 24$; $28 \leq b+c+e \leq 45$; $0 \leq f \leq 4$; $0 \leq d \leq$; $0 \leq g \leq 2$;

$Al_aX_dY_eI_g$, (IV) in which X represents at least one element chosen from among B, C, P, S, Ge, and Si, Y represents at least one element chosen from among V, Mo, Cr, Mn, Fe, Co, Ni, Ru, Rh and Pd and I represents the unavoidable production impurities; $0 \leq g \leq 2$, $0 \leq d \leq 5$, $18 \leq e \leq 29$ and $a+d+e+g=100$;

$Al_aCu_bCo_{b'}(B, C)_cM_dN_eI_f$ (V) in which M represents at least one element chosen from among Fe, Mn, V, Ni, Cr, Ru, Os, Mo, Mg, Zn and Pd; N represents at least one element chosen from among W, Ti, Zr, Hf, Rh, Nb, Ta, Y, Si, Ge, the rare earths and I represents the unavoidable production impurities; with $a+b+b'+c+d+e+f=100$; $a \leq 50$; $0 \leq b \leq 14$; $0 \leq b \leq 22$; $0 < b+b' \leq 30$; $0 \leq c \leq 5$; $8 \leq d \leq 30$; $0 \leq e \leq 4$; $f \leq 2$.

The quasi-crystalline alloys defined above are particularly suitable for the production on the one hand of coatings having a rough surface, and on the other hand coatings having high porosity, it being possible for the dimensions of the pores to be clearly greater than the wave length of the infra-red radiation. This irregularity of the surface, and especially the open pores facing the infra-red radiation constitute black bodies which increase considerably the absorption of the infra-red radiation. Taking account of the mechanical properties of these coatings, these black bodies are only sensitive to being sealed up by external agents such as dust. This disadvantage is however a minor one since the quasi-crystalline alloys form surfaces with only slight adhesive properties, which allows them to be easily cleaned. Conversely, the materials used in the devices of the prior art for absorbing infra-red radiation are very sensitive to the effects of dust which can only be removed by traditional methods of cleaning.

The quasi-crystalline alloys are therefore well suited for use as a coupler element for the infra-red radiation in the form of a layer deposited on a substrate. The layer of quasi-crystalline alloy can be made up of the quasi-crystalline alloy alone. It can also be made up of a mixture of a quasi-crystalline alloy and another material, for example, a binder.

The thickness of the layer of quasi-crystalline alloy is within a range of about ten nanometers to a few tens of micrometers, depending on the nature of the device according to the invention.

The layer of quasi-crystalline alloy can be deposited on a suitable substrate according to various methods.

A first method consists of spraying onto the substrate to be coated a quasi-crystalline alloy powder using a hot spraying device, such as a plasma torch or a blowtorch with a supersonic flame. One can also use a blowtorch with a conventional flame supplied with a mixture of oxygen and a combustible gas such as acetylene or propane, for example. When a blowtorch with a conventional flame is used, it is preferable to supply it using a flexible line which allows one, for example, to develop the quasi-crystalline structure directly in the flame, as described in EP-A-0 504 048 (J. M. Dubois, M. Ducos, R. Nury). These methods that use hot spraying allow one to obtain coatings, the thickness of which is between about 10 gm and a few hundreds of $\mu$m, typically coatings whose thickness is of the order of mm.

Another technique consists of carrying out the deposition from the vapor phase. Various vapor phase deposition methods are known. By way of example, one can mention cathodic sputtering, the technique of evaporation under vacuum and laser ablation. For each of the vapor phase deposition techniques, one can use either a single source made up of a material, the composition of which will be adjusted in such a way as to obtain the desired composition on the substrate. Also several sources can be used, each corresponding to one of the elements making up the quasi-crystalline alloy. When several sources are used, either a simultaneous deposition or a sequential deposition can be made. Simultaneous deposition from several sources requires simultaneous control of several deposition flows to obtain the desired alloy composition. When successive layers are deposited from several sources, it is sometimes necessary to carry out a subsequent heat treatment in order to mix the different deposited elements and obtain the quasi-crystalline alloy. The vapor phase deposition techniques allow one to obtain layers of quasi-crystalline alloys having a very small thickness, typically less than 10 $\mu$m, more particularly less than 0.3 $\mu$m.

A layer of quasi-crystalline alloy can in addition be obtained by coating a substrate with a paint essentially made up of a quasi-crystalline alloy powder and an organic binder. The layers thereby obtained generally have a thickness greater than I pm, more particularly between 5 and 50 $\mu$m.

The porosity and the roughness of the layers of quasi-crystalline alloy obtained depend on the method used to obtain them. The use of a plasma torch produces layers having a porosity of the order of from 5 to 10%. The layers obtained using a supersonic blowtorch are practically free of porosity. Using an oxy-gas blowtorch supplied with a powder, the particles of which have a diameter greater than 100 $\mu$m, one can obtain porous layers whose mean pore diameter is between about 2 and 30 $\mu$m. The layers obtained by vapor phase deposition are free of porosity. The layers obtained by application of a paint comprising a quasi-crystalline alloy powder and an organic binder, generally have a porosity of from 15 to 30%.

The coupler element for the infra-red radiation of a device according to this invention can be made up of a single grain quasi-crystal, which can be obtained for example by the growth techniques of Bridgman or Czochralsky.

A particular device according to this invention can be a bolometer, in which the quasi-crystalline alloy plays both the role of an infra-red radiation absorber and that of a resistive sensitive element. In such a device, the quasi-crystalline alloy can be in the form of a thin layer, preferably having a thickness of between 0.1 and 1 μm. The quasi-crystalline alloy can also be used in the form of a single grain quasi-crystal.

Another particular device according to this invention is a temperature sensor, in which the substrate is a thermocouple, a layer of quasi-crystalline alloy enveloping the thermocouple. In such a device, the layer of quasi-crystalline alloy preferably has a thickness of between 1 and 50 μm.

A device according to this invention can also be a device for photothermal conversion, such as a collector with a heat exchange fluid for solar heating (of the hot water collector type or of the air collector type), a collector for solar refrigeration or a passive collector of the Trombe wall type. In this type of device, the quasi-crystalline alloy can be deposited on substrates, the form and the nature of which vary very widely. The support for a Trombe wall is generally a concrete wall. In the collectors with a heat exchange fluid, the substrate is made up of a material that is a good conductor of heat, for example, a steel, copper or an alloy of aluminum, in the form of a plane, a profile or a groove. The layer of quasi-crystalline alloy replaces the organic paints or the deposits of finely divided metal powder used in the devices of the prior art. In the range of wavelengths of from 0.2 to 2 μm, the coefficient of absorption of the infra-red radiation of a coating according to this invention is only 3% less at the most than that of a selective commercial coating such as the commercial coating MAXORB, over which nevertheless, it has all the advantages associated with a long life and good resistance to corrosion and to scratching. A coating according to the invention is as a consequence, competitive for devices for the photo-conversion of solar energy. The deposition of the quasi-crystalline alloy coating for these particular devices can be carried out by the techniques of thermal spraying, for example, using a plasma torch or a powder blowtorch. The coatings obtained in this way are intimately bonded to the substrate through an interface with excellent mechanical properties and good resistance to being torn off. This interface offers low thermal resistance to the flow of heat transmitted to the heat exchange fluid. The corrosion resistance of the coatings are particularly good as well as the mechanical strength thanks to the high hardness of the quasi-crystalline alloys and their high resistance to wear, to scratching and to abrasion. For solar energy collectors, particularly exposed collectors, these properties mean that they do not require a protective glass screen.

Another device according to this invention consists of a hot plate comprising a coating of a quasi-crystalline coating on a substrate.

A hot plate can be used in the cooking field for example in the form of a cooking surface, a grill or an oven plate. As a substrate, the bottom of a transparent cooking utensil can be used, made of Pyrex glass for example, the layer of alloy being deposited on the inside of the receptacle. For this particular use, it is desirable to use a quasi-crystalline alloy, the atomic composition of which belongs to the Group V mentioned above, in particular a composition $Al_{\sim 71}Cu_{\sim 9}Fe_{\sim 10}Cr_{\sim 10}$. The surface in contact with the food will be of interest for its anti-adhesive properties, the surface facing the heat source, from which it is only separated by the layer of glass which is used as a substrate, will absorb the infra-red radiation.

A hot plate can also be used for domestic heating, in the form of a heat economizer, in the form of a fire back, or in radiant heating equipment or heat accumulation apparatus.

A device according to this invention can also constitute an infra-red radiation filter, comprising a substrate transparent to the infra-red radiation, coated with a layer of quasi-crystalline alloy. The substrate can be a quartz substrate. The thickness of the quasi-crystalline alloy layer is, in this case, less than or equal to 0.3 μm, and the quasi-crystalline alloy preferably comprises at least 80% by volume of a quasi-crystalline phase or a phase approximating to one.

This invention is described below in greater detail, referring for example to particular examples which are given only to illustrate the invention. However, the invention is not limited to these examples.

EXAMPLE 1

Preparation of Reference Samples

Two samples of quasi-crystalline alloys were prepared, with reference numbers E1 and E2, for the purpose of comparing their surface conditions and their coefficients of infra-red radiation absorption with those of certain materials from the prior art. A sample was also prepared of each of the metals present in the composition of the quasi-crystalline alloys which are designated E3 to E6.

Each of the quasi-crystalline alloys intended for the preparation of samples E1 and E2 were produced by fusion of the pure elements in a high frequency electromagnetic field, under an argon atmosphere in a cooled crucible made of copper. While the alloy is being held in the molten condition, a solid cylindrical test piece 25 mm diameter, and a few centimeters high was formed by aspiration of the liquid metal into a quartz tube. The rate of cooling of this sample was close to 500° C. per second. The cooled test piece was cut up into small parallelepiped shaped ingots with dimensions 5×15×15 mm using a metallographic saw. Next, one of the square faces of each small ingot were mechanically polished using a conventional method and then using diamond paste. At the end of the polishing, the arithmetic roughness of the polished surface of each sample was between 0.2 and 0.6 μm.

The small parallelepiped-shaped ingots with dimensions 5×15×15 mm, of each of the metals involved in the composition of the quasi-crystalline alloys were produced from commercial ingots of the constituent elements having a purity of 99.999 for Al, 99.9 for Fe, Cr and Cu. One of the square surfaces of each small ingot was polished in the same way as for the small ingots of quasi-crystalline alloy. The arithmetic roughness Ra after polishing was determined. The results obtained and the crystallographic structures of the different samples are given in the following Table 1.

TABLE 1

| Sample No. | Composition (atomic %) | Crystal structure | Ra (after polishing) |
|---|---|---|---|
| E1 | $Al_{62}Cu_{25.5}Fe_{12.5}$ | icosahedric | 0.2 μm |
| E2 | $Al_{70}Cu_9Fe_{10.5}Cr_{10.5}$ | orthorhombic approximating the decagonal phase | 0.2 μm |
| E3 | aluminum metal | face centered cubic | 0.2 μm |
| E4 | copper metal | face centered cubic | 0.2 μm |
| E5 | iron metal | face centered cubic | 0.3 μm |
| E6 | chromium metal | face centered cubic | 0.6 μm |

EXAMPLE 2

Preparation of Quasi-crystalline Coatings Intended for the Absorption of the Infra-red Radiation Substrates coated with a layer of quasi-crystalline alloy deposited by thermnal spraying were prepared. In all cases, the substrate is a lightly alloyed steel plate prepared before spraying in accordance with the conventional methods for thermal spraying.

Sample R1 consists of a coating of 150 gm thickness produced from a powder, the composition of which is identical to that of the sample E1 which was sprayed using a supersonic JetKote® gun sold by the Browning company.

Sample R2 was prepared in the same way as sample R1, but it was subjected additionally to mechanical polishing as described in Example 1 so as to reduce its roughness.

Sample R3 consists of a coating of 150 gm thickness produced from a powder, the composition of which is identical to that of the sample E1 and deposited by plasma spraying followed by mechanical polishing with a view to reducing its roughness.

Sample R4 includes a coating deposited by spraying in a blowtorch with a flame from a line containing a quasi-crystalline alloy powder having the composition of sample E2. Such a line is traditionally made up of a core comprising an organic binder and a quasi-crystalline alloy powder or a mixture of powders capable of forming a quasi-crystalline alloy, this core being surrounded by a sheath made of organic material. In the present case, the binder was Tylose and the sheath was made of Tylose, both being supplied by the company Hoechst.

Sample R5 is obtained in the same way as sample R4, but was subjected to mechanical polishing analogous to that for sample R3 with a view to reducing its roughness.

The characteristics of the different samples are collected together in Table 2 below.

TABLE 2

| Coating No. | Origin | Method of preparation | Main quasi-crystalline phase | % vol. of quasi-crystalline phase in the coating | Roughness Ra in μm |
|---|---|---|---|---|---|
| R1 | E1 | supersonic gun | icosahedric | 70% | 8–10 |
| R2 | E1 | supersonic gun + polishing | icosahedric | 70% | 1 |
| R3 | E1 | plasma spraying + polishing | icosahedric | 80% | 1 |
| R4 | E2 | powder blow torch | approximating the decagonal phase | 50% | 15–20 |
| R5 | E2 | powder blow torch + polishing | approximating the decagonal phase | 50% | 3–5 |

EXAMPLE 3

Measurement of the Porosity Open at the Surface of the Samples

The metallographic examination of the samples was carried out after polishing the samples. The open pore distribution was characterized using quantitative imaging." The measurements were carried out using the "VISILOG" system sold by the company Neosis, connected through a CCD camera (sold by the company Sony) to a "Polyvar" optical microscope sold by the company Reichert and an electronic plug-in unit "Serie 151" sold by the company Imaging Technology. All the samples, E1 to E6 and R1 to R5 were subjected to this measurement. The relative mean area of pores opening onto the surface is shown in Table 3. For samples R1 and R4, the determination of the relative area was not possible since the roughness was too great.

TABLE 3

| Sample No. | Relative area (%) |
|---|---|
| E1 | 4 |
| E2 | 6 |
| E3 | 1 |
| E4 | 1 |
| E5 | 0.3 |
| E6 | 0.3 |
| E7 | 3 |
| R1 | determination impossible |
| R2 | 10 |
| R3 | 63 |
| R4 | determination impossible |
| R5 | 51 |

EXAMPLE 4

Measurement of the Rate of Absorption of the Infra-red Radiation

So as to determine the infra-red absorption of the various samples while seeking to differentiate the specularly reflected part from the part reflected in a diffuse manner, three complementary reflectivity measurements were carried out the specular reflectivity (Rs) characteristic of a polished surface, was measured continuously within the range 2.5–40 μm on a Perkin Elmer spectrophotometer the hemispherical reflectivity (Rh) allows one to integrate the diffuse reflection with the specular reflection. The corresponding measurements are perfectly adapted both for the strongly diffusing rough samples and the polished samples having high porosity. An integration sphere made of gold was used for the measurements of Rh. The signals recorded are from a germanium bolometer cooled to the temperature of liquid helium. A set of lattices used as monochromators enables measurements to be carried out step by step at wavelengths of 2,5–5–5.8 and 10 μm.

the bi-directional reflectivity (Rb), was continuously recorded for a fixed angle of incidence of the radiation onto the sample (corresponding to the reflected signal maximum at 0°) in relation to the angle of reflection θ within the range (θ=−10°, θ=+70°) and for the wavelengths 2.5–5–5.8 and 10 μm. The device used is the same as the preceding one, the integration sphere being removed and the sample placed on a goniometer having two angular movements (angle of incidence, angle of reflection). The integration of the curves Rb =F(θ) and a normation allows one to obtain the integrated bi-directional reflectivity Rbi.

These measurements enable one to confirm the low diffuse reflectivity of the shiny and low porosity samples and to define the coefficient of absorption A:

for the polished, low porosity samples, for which the diffuse reflection is negligible, A=1-R, with R=Rs or Rbi.

for the rough samples, for which the specular reflection is zero or low, A=1—Rh;

for the polished, high porosity samples, for which there is both a specular reflection and a diffuse reflection, A=1—Rh since Rh integrates the specular reflection and the diffuse reflection.

The characteristic values of the coefficient of absorption expressed in (%±2%) are given for four wavelengths and various samples in Table 4 below.

EXAMPLE 5

(Comparative)

Absorption of the Infra-red Radiation by a Coating of the Prior Art

The Maxorb strip is a selective surface made of ultra thin nickel obtained by electro-deposition from a nickel plating bath onto a rotating drum. The strip is then passed into a solution producing a surface of black oxide. Finally the strip receives or does not receive a adhesive which permits, for example, its use on the surface exposed to the radiation of an energy economizer. A Maxorb covered collector has performance 20–30% greater than that of a device coated with black paint. For using temperatures which can range up to 300° C. and for highly profiled absorbers, the Maxorb surface can be directly produced on the surface of the absorber.

The characteristic data for a Maxorb strip as measured are given in Table 4. The values are at the most equal to those obtained with the polished coatings of this invention (R2, R3 and R5) and clearly lower than the values obtained with the rough coatings (R1 and R4).

TABLE 4

| Sample wavelength | | 2.5 μm | 5 μm | 8 μm | 10 μm |
|---|---|---|---|---|---|
| E1 | | 38 | 38 | 38 | 38 |
| E2 | | 38 | 39 | 41 | 40 |
| R1 | rough | 62 | 62 | 62 | 60 |
| R2 | polished | 44 | 35 | 30 | 28 |
| R3 | polished | 49 | 44 | 43 | 42 |
| R4 | rough | 73 | 68 | 68 | 64 |
| R5 | polished | 65 | 60 | 60 | 54 |
| Maxorb | | 55 | 26 | 25 | 22 |

EXAMPLE 6

Hot plates including a quasi-crystalline alloy coating Two square hot plates with 25 cm sides and having a thickness of 1 cm made of type AU4G (2017A) aluminum alloy were tested. one of the plates did not have any coating, but one of its square surfaces was sand blasted and had a roughness identical to that of sample R1 of the present invention. The other plate had one surface covered with coating R3.

Each of the plates was positioned facing a heat source consisting of a halogen lamp with a power of 1060 W and placed at a distance of 15 cm. and in a vertical plane parallel to that of the plate. The temperature of the surface that was not exposed to the light source was measured by a thermocouple held in contact with this surface. FIG. 1 reproduces the temperature variations ΔT (expressed in mV from the thermocouple signal) as a function of time t (in minutes) after the lamp was switched on, for the plate B 12327 MDT having a layer of quasi-crystalline alloy (curve A) and for the plate without any coating (curve B). An increase of the order of 20% in the absorption of the infra-red radiation may be observed.

This example shows clearly the superiority of the light absorption obtained thanks to the coating of the invention, and this despite a lower specific surface, since the coating R3 was polished, while conversely the aluminum alloy plate had had its roughness artificially increased. The energy benefit can be estimated to be 20% in this example.

What is claimed is:

1. A device absorbing infra-red radiation which comprises as the element absorbing the infra-red radiation in the range of wave lengths higher than 2 μm, an element made of a quasi-crystalline alloy having one or more quasi-crystalline phases, the volume of which represents at least 40% by volume of said quasi-crystalline alloy, a quasi-crystalline phase being either (i) a quasi-crystalline phase which exhibits a rotational symmetry selected from the group consisting of symmetries with a 5-, 8-, 10- and 12-fold rotation axis, or (ii) an approximant phase or an approximant compound which is a true crystal, said approximant phase or compound having a crystallographic structure which exhibits translational symmetry, but which exhibits, in an electron diffraction photograph thereof, diffraction patterns sufficiently close to those of a symmetry of at least one of 5-, 8-, 10- and 12-fold rotation axes such that said diffraction patterns are not distinguishable from those exhibited by a structure having rotational symmetry with said at least one rotation axis; and wherein said layer of quasi-crystalline alloy has a porosity from 5 to 10%.

2. A device absorbing infra-red radiation which comprises as the element absorbing the infra-red radiation in the range of wave lengths higher than 2 μm, an element made of a quasi-crystalline alloy having one or more quasi-crystalline phases, the volume of which represents at least 40% by volume of said quasi-crystalline alloy, a quasi-crystalline phase being either (i) a quasi-crystalline phase which exhibits a rotational symmetry selected from the group consisting of symmetries with a 5-, 8-, 10- and 12-fold rotation axis, or (ii) an approximant phase or an approximant compound which is a true crystal, said approximant phase or compound having a crystallographic structure which exhibits translational symmetry, but which exhibits, in an electron diffraction photograph thereof, diffraction patterns sufficiently close to those of a symmetry of at least one of 5-, 8-, 10- and 12-fold rotation axes such that said diffraction patterns are not distinguishable from those exhibited by a structure having rotational symmetry with said at least one rotation axis; and wherein said layer of quasi-crystalline alloy is porous, the mean diameter of the pores being between about 1 and 30 μm.

3. A device absorbing infra-red radiation which comprises as the element absorbing the infra-red radiation in the range of wave lengths higher than 2 μm, an element made of a quasi-crystalline alloy having one or more quasi-crystalline phases, the volume of which represents at least 40% by volume of said quasi-crystalline alloy, a quasi-crystalline phase being either(i) a quasi-crystalline phase which exhibits a rotational symmetry selected from the group consisting of symmetries with a 5-, 8-, 10- and 12-fold rotation axis, or (ii) an approximant phase or an approximant compound which is a true crystal, said approximant phase or compound having a crystallographic structure which exhibits translational symmetry, but which exhibits, in an electron diffraction photograph thereof, diffraction patterns sufficiently close to those of a symmetry of at least one of 5-, 8-, 10- and 12-fold rotation axes such that said diffraction patterns are not distinguishable from those exhibited by a structure having rotational symmetry with said at least one rotation axis; and wherein said element of quasi-crystalline alloy is in the form of a single grain crystal.

4. The device according to any one of claim 1, 2, or 3, wherein the quasi-crystalline alloy contains as a quasi-crystalline phase, an icosahedric phase of point group m35 or a decagonal phase of the point group 10/mmm.

5. The device according to any one of claim 1, 2, or 3, wherein the quasi-crystalline alloy contains at least 80% by volume of a quasi-crystalline phase or an approximating phase.

6. The device according to any one of claim 1, 2, or 3, wherein the quasi-crystalline alloy is selected from the group consisting of one of the following nominal compositions which are given in atomic percentage:

$Al_a Cu_b Fe_c X_d Y_e I_g$, (I) in which X represents at least one element selected from the group consisting of B, C, P, S, Ge and Si, Y represents at least one element selected from the group consisting of V, Mo, Ti, Zr, Nb, Cr, Mn, Ru, Rh, Ni, Mg, W, Hf, Ta and the rare earths, I represents the inevitable production impurities, $0 \leq g \leq 2$, $14 \leq b \leq 30$, $7 \leq c \leq 20$, $0 \leq d \leq 5$, $21 \leq b+c+e \leq 45$ and $a+b+c+d+e+g=100$;

$Al_a Pd_b X_c Y_d T_e I_g$, (II) in which X represents at least one metalloid selected from the group consisting of B, C, Si, Ge, P and S; Y represents at least one metal selected from the group consisting of Fe, Mn, V, Ni, Cr, Zr, Hf, Mo, W, Nb, Ti, Rh, Ru, Re, Ta; T is at least one rare earth; I represents the unavoidable production impurities; with $a+b+c+d+e+f+g=100$; $17 \leq b \leq 30$; $0 \leq c \leq 8$; $5 \leq d \leq 15$; $0 \leq e \leq 4$; $0 \leq g \leq 2$;

$Al_a Cu_b Co_c X_d Y_e T_f I_g$, (III) in which X represents at least one metalloid selected from the group consisting of B, C, Si, Ge, P and S; Y represents at least one metal selected from the group consisting of Fe, Mn, V, Ni, Cr, Zr, Hf, Mo, W, Nb, Ti, Rh, Ru, Re; T is at least one rare earth; I represents the unavoidable production impurities; with $a+b+c+d+e+f+g=100$; $14 \leq b \leq 27$; $8 \leq c \leq 24$; $28 \leq b+c+e \leq 45$; $0 \leq f \leq 4$; $0 \leq d \leq 5$; $0 \leq g \leq 2$;

$Al_a X_d Y_e I_g$, (IV) in which X represents at least one element selected from the group consisting of B, C, P, S, Ge, and Si, Y represents at least one element selected from the group consisting of V, Mo, Cr, Mn, Fe, Co, Ni, Ru, Rh and Pd, I represents the unavoidable production impurities, $0 \leq g \leq 2, 0 \leq d \leq 5$, $18 \leq e \leq 29$ and $a+d+e+g=100$ and $Al_a Cu_b Co_{b'} (B, C)_c M_d N_e I_f$ (V) in which M represents at least one element selected from the group consisting of Fe, Mn, V, Ni, Cr, Ru, Os, Mo, Mg, Zn and Pd; N represents at least one element selected from the group consisting of W, Ti, Zr, Hf, Rh, Nb, Ta, Y, Si, Ge, the rare earths; I represents the unavoidable production impurities; with $a+b+b'+c+d+e+f=100$; $a \leq 50$; $0 \leq b \leq 14$; $0 \leq b' \leq 22$; $0 \leq b+b' \leq 30$; $0 \leq c \leq 5$; $8 \leq d \leq 30$; $0 \leq e \leq 4$; $f \leq 2$.

7. The device according to any one of claim 1, 2, or 3, wherein the coupler element for the infra-red radiation is in the form of a thin layer of quasi-crystalline alloy deposited on a substrate.

8. The device according to claim 7, wherein the thickness of the layer of quasi-crystalline alloy is, at the most, equal to 10 μm.

9. The device according to claim 7, wherein the thickness of the layer is between 10 μm and 50 μm.

10. The device according to claim 7, wherein the thickness of the layer of quasi-crystalline alloy is $\leq 10$ μm.

11. The device according to claim 7, wherein the thickness of the layer of quasi-crystalline alloy is $\leq 0.3$ μm.

12. The device according to claim 7, wherein the layer of quasi-crystalline alloy has a porosity from 15 to 30%.

13. The device according to any one of claim 1, 2, or 3, comprising a bolometer, in which the layer of quasi-crystalline alloy plays both the role of infra-red radiation absorber and of a resistive sensitive element.

14. The device according to any one of claim 1, 2, or 3, comprising a temperature sensor, in which the substrate is constituted by a thermocouple, the quasi-crystalline alloy encasing the thermocouple.

15. The device according to any one of claim 1, 2, or 3, for photo-thermal conversion.

16. The device according to claim 15, comprising a collector with a heat exchange fluid for solar heating.

17. The device according to claim 15, comprising a collector for solar refrigeration.

18. The device according to claim 15, comprising a passive collector.

19. The device according to any one of claim 1, 2, or 3, comprising a hot plate.

20. The device according to claim 19, where said hot plate comprises the following composition:

$Al_a Cu_b Co_{b'} (B, C)_c M_d N_e I_f$ (V) in which M represents at least one element selected from the group consisting of Fe, Mn, V, Ni, Cr, Ru, Os, Mo, Mg, Zn and Pd; N represents at least one element selected from the group consisting of W, Ti, Zr, Hf, Rh, Nb, Ta, Y, Si, Ge, the rare earths; I represents the unavoidable production impurities; with $a+b+b'+c+d+e+f=100$; $a \leq 50$; $0 \leq b \leq 14$; $0 \leq b' \leq 22$; $0 \leq b+b' \leq 30$; $0 \leq c \leq 5$; $8 \leq d \leq 30$; $0 \leq e \leq 4$; $f \leq 2$.

21. The device according to any one of claim 1, 2, or 3, which comprises an infra-red radiation filter comprising a quartz substrate coated with a layer of a, quasi-crystalline alloy having a thickness less than or equal to 0.3 μm, and in that the quasi-crystalline alloy comprises at least 80% by volume of a quasi-crystalline phase or an approximating phase.

\* \* \* \* \*